United States Patent
Bartlett et al.

(10) Patent No.: US 7,698,604 B2
(45) Date of Patent: *Apr. 13, 2010

(54) STORAGE CONTROLLER AND A METHOD FOR RECORDING DIAGNOSTIC INFORMATION

(75) Inventors: Eric John Bartlett, Salisbury (GB); William James Scales, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 11/951,034

(22) Filed: Dec. 5, 2007

(65) Prior Publication Data

US 2008/0091982 A1 Apr. 17, 2008

Related U.S. Application Data

(63) Continuation of application No. 10/911,801, filed on Aug. 4, 2004, now Pat. No. 7,346,810.

(30) Foreign Application Priority Data

Aug. 6, 2003 (GB) .................................. 0318384.5

(51) Int. Cl.
G06F 11/00 (2006.01)
(52) U.S. Cl. .......................................... 714/45; 714/48
(58) Field of Classification Search ...................... None
See application file for complete search history.

(56) References Cited

U.S. PATENT DOCUMENTS

| | | | |
|---|---|---|---|
| 4,584,639 A | 4/1986 | Hardy | |
| 4,888,691 A | 12/1989 | George et al. | |
| 5,224,213 A | 6/1993 | Dieffenderfer et al. | |
| 5,274,811 A | 12/1993 | Borg et al. | |
| 6,543,010 B1* | 4/2003 | Gaudet et al. | 714/45 |
| 6,600,614 B2* | 7/2003 | Lenny et al. | 360/31 |
| 6,813,731 B2 | 11/2004 | Zahavi et al. | |
| 6,952,793 B2* | 10/2005 | Nagasuka et al. | 714/5 |
| 7,069,479 B2 | 6/2006 | Hester et al. | |
| 2002/0078264 A1 | 6/2002 | Eberhard | |
| 2003/0061550 A1 | 3/2003 | Ng et al. | |
| 2004/0117690 A1 | 6/2004 | Andersson | |

* cited by examiner

Primary Examiner—Gabriel L Chu
(74) Attorney, Agent, or Firm—Dillon & Yudell LLP

(57) ABSTRACT

A storage controller (104) for a storage system (100) in which there are multiple storage devices (109) and a method for recording diagnostic information are provided. The storage controller (104) includes a storage device manager (203) which has means for allocating a storage device (109) in the storage system (100) for storing diagnostic data. The storage controller (104) also includes means for generating diagnostic data regarding the operation of the storage controller (104). Two buffers (207, 208) are used for alternately recording and writing batches of diagnostic data to the allocated storage device (109). The allocated storage device may be a storage device which is normally reserved for disaster recovery in the storage system (100).

20 Claims, 4 Drawing Sheets

STORAGE CONTROLLER AND A METHOD FOR RECORDING DIAGNOSTIC INFORMATION

The present application is a continuation of U.S. patent application Ser. No. 10/911,801, filed on Aug. 4, 2004 now U.S. Pat. No. 7,346,810, and entitled, "A Storage Controller and a Method for Recording Diagnostic Information," which is incorporated herein by reference.

FIELD OF THE INVENTION

This invention relates to the field of storage subsystems and in particular to a method and apparatus for recording diagnostic information in storage subsystems.

BACKGROUND OF THE INVENTION

Mass storage subsystems provide increasing storage capacity to meet user demands from host computer system applications. Various storage device configurations are known and used to meet the demand for higher storage capacity whilst maintaining or enhancing the reliability of the mass storage subsystem.

One of the storage configurations that meets demands for increased capacity and reliability is the use of multiple smaller storage modules which are configured to permit redundancy of stored data to ensure data integrity in case of failures. In such redundant subsystems, recovery from many types of failure can be automated within the storage subsystem itself due to the use of data redundancy. An example of such a redundant subsystem is redundant arrays of inexpensive disks (RAID).

Storage subsystems have one or more storage controllers that manage the storage and provide upstream interfaces for I/O to the storage. The storage controller manages an array of storage devices for one or more host systems. The storage controller makes the array of storage devices appear to a host system to be a single, high capacity storage device.

A hardware card that plugs into some form of data communications bus that provides the function of a storage controller is referred to as an adapter card.

Trace tables are data buffers that are filled as a program executes with time-stamped status information about what the program is doing. In the embedded firmware development environment found on storage adapter cards and storage controller systems (both now referred to generally as storage controllers), trace tables are a key instrument to allow problem determination during development and for in field support. In these situations other methods of recording ongoing status information, for example printed outputs to a terminal display, are not available for performance reasons.

Presently trace tables in storage controller systems are stored in non-persistent memory. In storage controller embedded firmware environments, memory usage is very limited and primarily reserved for I/O data path usage.

The use of this memory for the trace tables is limited by the cost of memory and its physical size. This limits the amount of memory usable for the trace table data. This trace table size limitation leads to the trace tables wrapping, sometimes within seconds depending on the system and the load conditions. This can cause valuable trace information to be lost as a problem develops over a given period. The loss of such trace information slows or even prevents problem determination.

A usual solution to the problem of analysis being frustrated by key information in the trace table being overwritten by more recent entries is to devise alternative ways to stop the code earlier. This has the disadvantage that it is time consuming and requires problem recreation which is not always possible.

The trace table data can be transferred or 'dumped' to disk during a controlled system shutdown for problem determination but this is not always possible due to memory restrictions. In such conditions, since the trace table data is stored in non-persistent memory the trace table information is lost. The trace table information is also not continuous through the reset, which is potentially when problem determination is required. This can again cause valuable trace information to be lost.

It is an aim of the present invention to provide a method and apparatus for recording trace table information in storage systems in which allows large amounts of trace data to be recorded providing an extended trace history. An extended trace history is required to determine problems that develop gradually over a period of time.

SUMMARY OF THE INVENTION

According to a first aspect of the present invention there is provided a storage controller for a storage system in which there are multiple storage devices, the storage controller comprising: a storage device manager including means for allocating a storage device in the storage system for storing diagnostic data; means for generating diagnostic data regarding the operation of the storage controller; and a buffer means for recording and writing batches of diagnostic data to the allocated storage device.

The allocated storage device for storing diagnostic data may be a storage device normally reserved for disaster recovery, for example a hot spare storage device.

The buffer means may include a first buffer and a second buffer for alternately recording and writing batches of diagnostic data to the allocated storage device.

Preferably, the storage controller includes non-volatile memory in which the address of the allocated storage device is recorded.

The storage system may be a RAID system, the allocated storage device may be a hot share storage device and the storage device manager may be a hot spare storage device manager. The diagnostic data regarding the operation of the storage controller may be trace table data.

Preferably, the storage controller includes firmware for writing the diagnostic data to the allocated storage device via the buffers.

According to a second aspect of the present invention there is provided a storage system comprising one of more storage controllers, each storage controller comprising: a storage device manager including means for allocating a storage device in the storage system for storing diagnostic data; means for generating diagnostic data regarding the operation of the storage controller; and buffer means for recording and writing batches of diagnostic data to the allocated storage device.

According to a third aspect of the present invention there is provided a method for recording diagnostic information in a storage system having multiple storage devices, comprising: allocating a storage device in the storage system for storing diagnostic data; generating diagnostic data regarding the operation of a storage controller of the storage system; and using a buffering technique for recording and writing batches of diagnostic data to the allocated storage device.

The step of allocating a storage device for storing the diagnostic data allocates a storage device normally reserved for disaster recovery, for example a hot spare storage device.

The method preferably includes recording the address of the allocated storage device in non-volatile memory in the storage controller of the storage system.

In the event of an interruption in the operation of a storage controller of a storage system, the current address of the allocated storage device for storing diagnostic data may be recorded in non-volatile memory in the storage controller, such that on resumption of the operation of the storage controller the storage of the diagnostic data is sent to the recorded address.

In the event of an interruption, any unwritten diagnostic data may be sent to a system dump. After an interruption in the operation of a storage controller, a continuous diagnostic data history is obtained by combining the diagnostic data in the system dump and the diagnostic data in the allocated storage device.

The storage system may be a RAID system and an interruption may be a controlled shutdown of the storage controller.

The buffering technique may be a double buffering technique with a first batch of data being written at the same time as a second batch of data is being recorded.

The invention provides a storage controller with firmware adapted to locate and use spare disk capacity in a redundant storage system that it manages, so as to retain bulk diagnostic data.

BRIEF DESCRIPTION OF THE DRAWINGS

Embodiments of the present invention will now be described, by way of examples only, with reference to the accompanying drawings in which.

DETAILED DESCRIPTION OF THE PREFERRED EMBODIMENT

Figure 1:
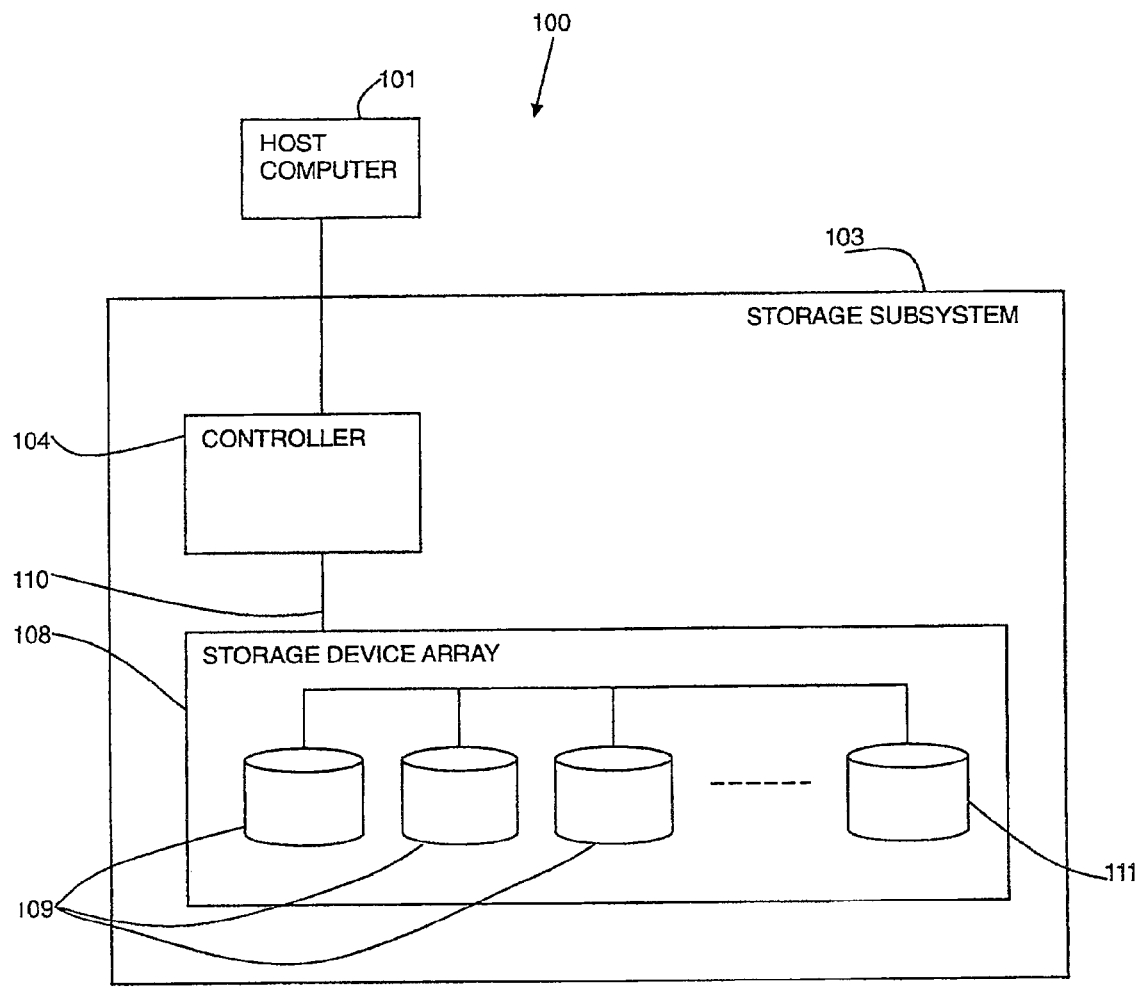
FIG. 1 is a block diagram of a computer storage subsystem in accordance with the present invention.

Referring to FIG. 1, a schematic block diagram of a computer system 100 with a storage subsystem 103 is shown in which the described method of the present invention may be applied. The storage subsystem 103 has a storage device array 108 with multiple storage devices 109. The storage devices 109 may be disk drives or other forms of storage device.

The storage device array 108 is managed by at least one redundant storage array storage controller 104. In the diagram one storage controller 104 is shown; however, it will be appreciated by a person skilled in the art that any number of storage controllers and storage devices may be used in a wide range of configurations.

A host computer 101 connects to the storage controller 104 to access data stored in the storage subsystem 103. The storage controller 104 makes the storage device array 108 appear to the host computer 101 to be a single high capacity storage device. A large variety of arrangements of one or more host computers and multiple storage controllers is possible and a simplified arrangement is shown in the figure.

The interface bus 110 between the storage controller 104 and the storage device array 108 including the storage devices 109 may be one of several industry standard interface buses including, for example, SCSI, Fibre Channel, SSA, etc.

The storage device array 108 may be a redundant array of inexpensive disks (RAID) in which data, along with information used for error correction such as parity bits, is distributed among two or more hard disks in order to improve performance and reliability.

In known systems, the storage controller 104 has embedded firmware that manages storage and provides upstream interfaces for I/O to the storage. The storage controller 104 also has a non-persistent memory in which I/O data path usage is stored and in which trace table data is stored. Trace table data is time-stamped status information about what the storage controller is doing.

Some forms of storage subsystems include hot spare storage devices which are not initially allocated to be used for customer I/O. Instead these storage devices are kept free for disaster recovery if one of the other storage devices fails. For example, in a RAID array, in the event of an array disk failure, a hot spare disk will take the place of the failed disk and the RAID array will rebuild to recover the initial RAID array configuration.

A hot spare storage device manager forms part of the storage controller 104 firmware. Its role is to identify and keep track of which set of storage devices can be used as hot spares for the associated RAID arrays.

In the described method and apparatus, a storage device manager of the storage controller 104 allocates a reserved storage device 111 (for example this may be a reserved hot spare storage device) and writes trace table data to that storage device 111 using the firmware standard I/O interfaces.

This allows large amounts of trace data to be recorded, being only limited by the size of the allocated storage device. This has the advantage of providing an extended trace history required to determine problems that develop gradually over a period of time.

Figure 2:
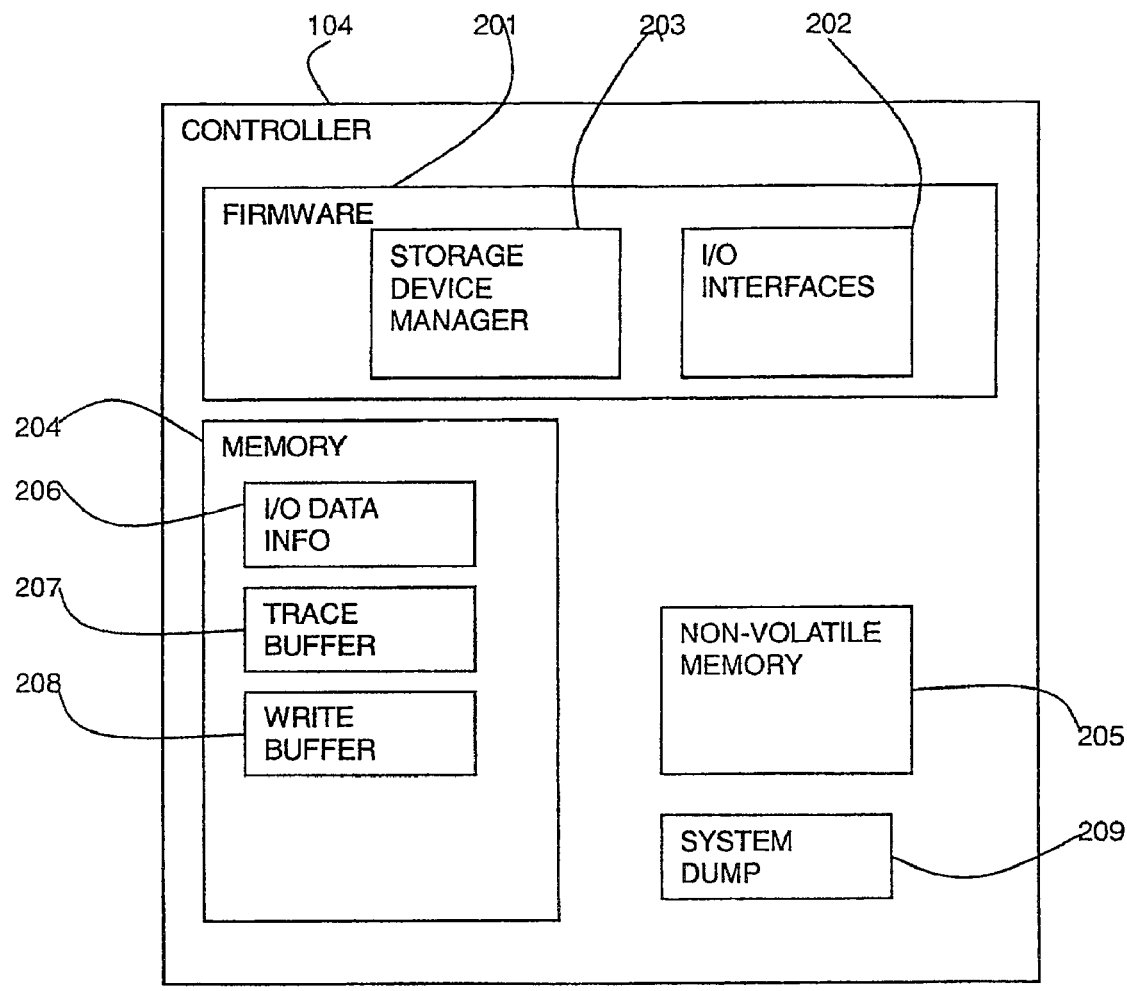
FIG. 2 is a block diagram of a storage controller of a computer storage subsystem in accordance with the present invention.

Referring to FIG. 2, a storage controller 104 for a storage subsystem is shown. The storage controller 104 has embedded firmware 201 with I/O interfaces 202. The storage controller 104 firmware 201 also includes a storage device manager 203 for managing the allocation of data to the array of storage devices. The storage device manager 203 may include a hot spare storage device manager if the storage array is a RAID system.

In the described method and apparatus, the storage device manager 203 reserves an area of the storage devices for use as a firmware trace table data storage device. In a storage subsystem with hot spare storage devices the hot spare storage device manager is used to reserve a hot spare storage device for use as the trace table data storage device.

In a storage subsystem without hot spare storage devices, an area of the storage devices which would normally be allocated for customer data can be reserved for the storage of the trace table data. The storage device manager 203 would allocate areas of storage on the storage devices alongside customer I/O applications.

When multiple storage controllers 104 share the same array 108 of storage devices 109, the storage device managers 203 ensures that each storage controller 104 is allocated a different reserved storage device for its trace table data to allow trace table data to be collected for each storage controller 104.

The storage controller 104 includes non-persistent memory 204 and non-volatile, persistent memory 205. The non-persistent memory 204 stores the I/O data path usage information 206. The non-persistent memory 204 of the described system also includes two buffers 207, 208 for trace table data.

The two buffers 207, 208 are used alternately as trace buffer and a write buffer. Trace table data is stored in the two buffers 207, 208 to accumulate the trace table data into batches which are then written to a reserved storage device in the storage array.

Two buffers 207, 208 are used to achieve a double buffering technique to manage the recording of trace table data and the writing or the trace table data to the storage device. The two buffers 207, 208 are of dynamic length.

A first buffer 207, acting as the trace buffer, is gradually filled with trace data while the second buffer 208, acting as the write buffer, is already full of trace table data and is being written to the storage device. When a write to the storage device has been completed and all the trace table data in the second buffer 208 has been written, the two buffers 207, 208 are swapped.

The first buffer 207 then becomes the write buffer and the trace table data in the first buffer 207 is written to the storage device. The second buffer 208 becomes the trace buffer in which new trace table data is recorded and the routine starts again.

In the described method, when the firmware 201 of the storage controller 104 initialises, a storage device 111 is reserved by the storage device manager 203 for use by the trace table data. The storage device reservation is permanently stored by the storage device manager 203 to make it persistent through system resets. This is stored in non-volatile memory 205 in the storage controller.

The storage address is continually changing as trace table data is written and this changing storage address is stored in the non-persistent memory 204 of the storage controller 104. The storage address is transferred to persistent memory 205 when the firmware 201 stops in a controlled manner as the storage address will need to be recovered after the restart. After a reset the trace table data is continued to be stored to the next available storage area providing a continuous trace through the interruption.

When the firmware 201 executes a controlled shutdown, it collates a predefined set of data and writes this to a system dump 209. This dump 209 contains the firmware's working data and is used for problem determination analysis by development. When the data in the system dump 209 and the trace table data stored in the allocated storage device are combined, a complete history can be obtained of the shutdown.

Figure 3:
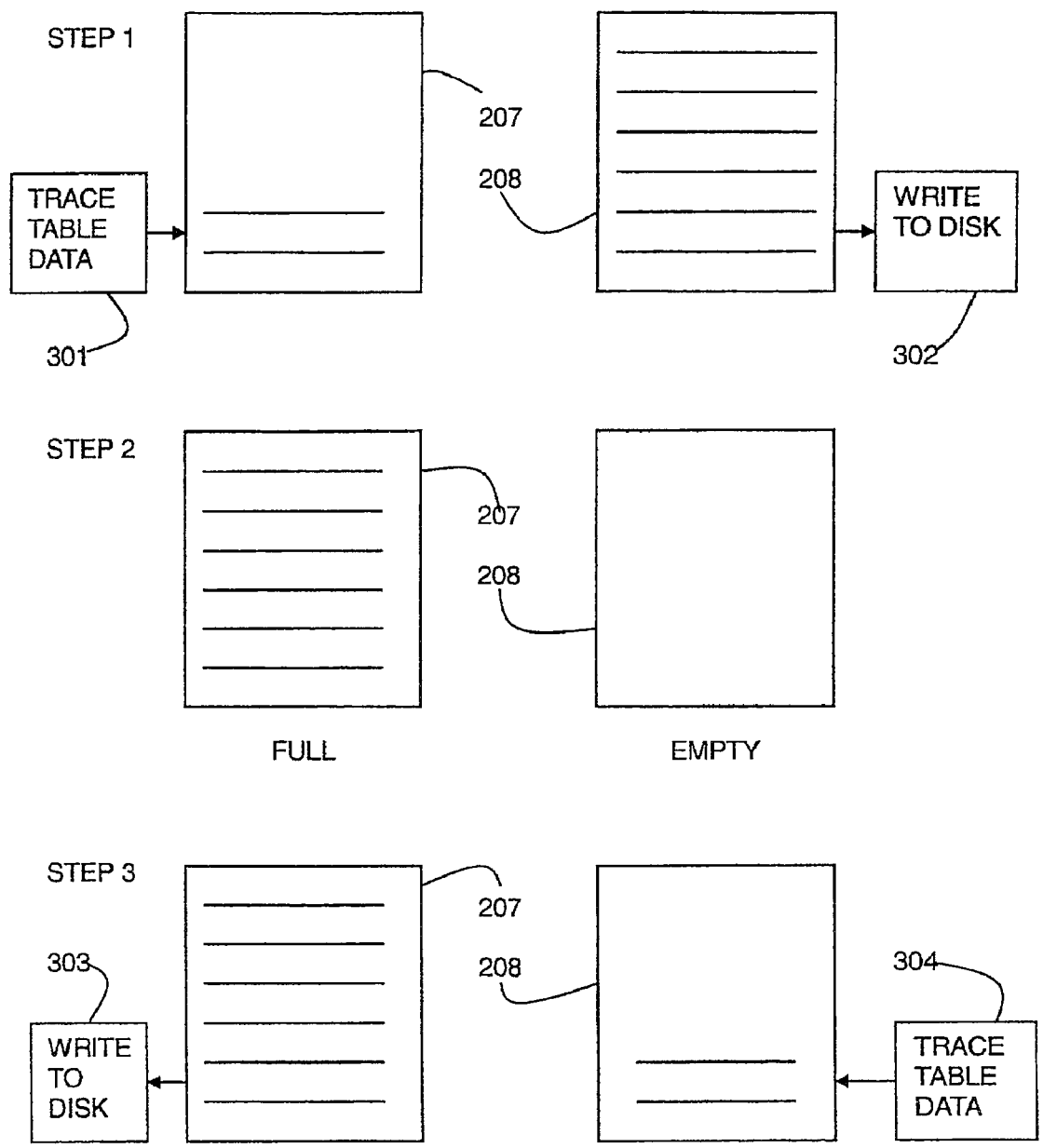
FIG. 3 is a schematic diagram of the buffers of a storage controller of a computer storage subsystem in accordance with the present invention.

FIG. 3 illustrates the use of the two buffers 207, 208. In step 1, one of the buffers 208 is full of trace table data and is acting as the write buffer writing the data to disk 302. Meanwhile, the other buffer 207 is acting as the trace buffer recording new trace table data 301.

Step 2 shows the two buffers 207, 208 when the write buffer has completed its write. The trace buffer is now full of data and so the actions of the buffers swap over.

Step 3 shows the buffer 207 which was acting as the trace buffer in step 1 now acting as the write buffer and writing the data to disk 303. The buffer 208 which was acting as the write buffer in step 1 is now acting as the trace buffer recording new trace table data 304.

Figure 4:
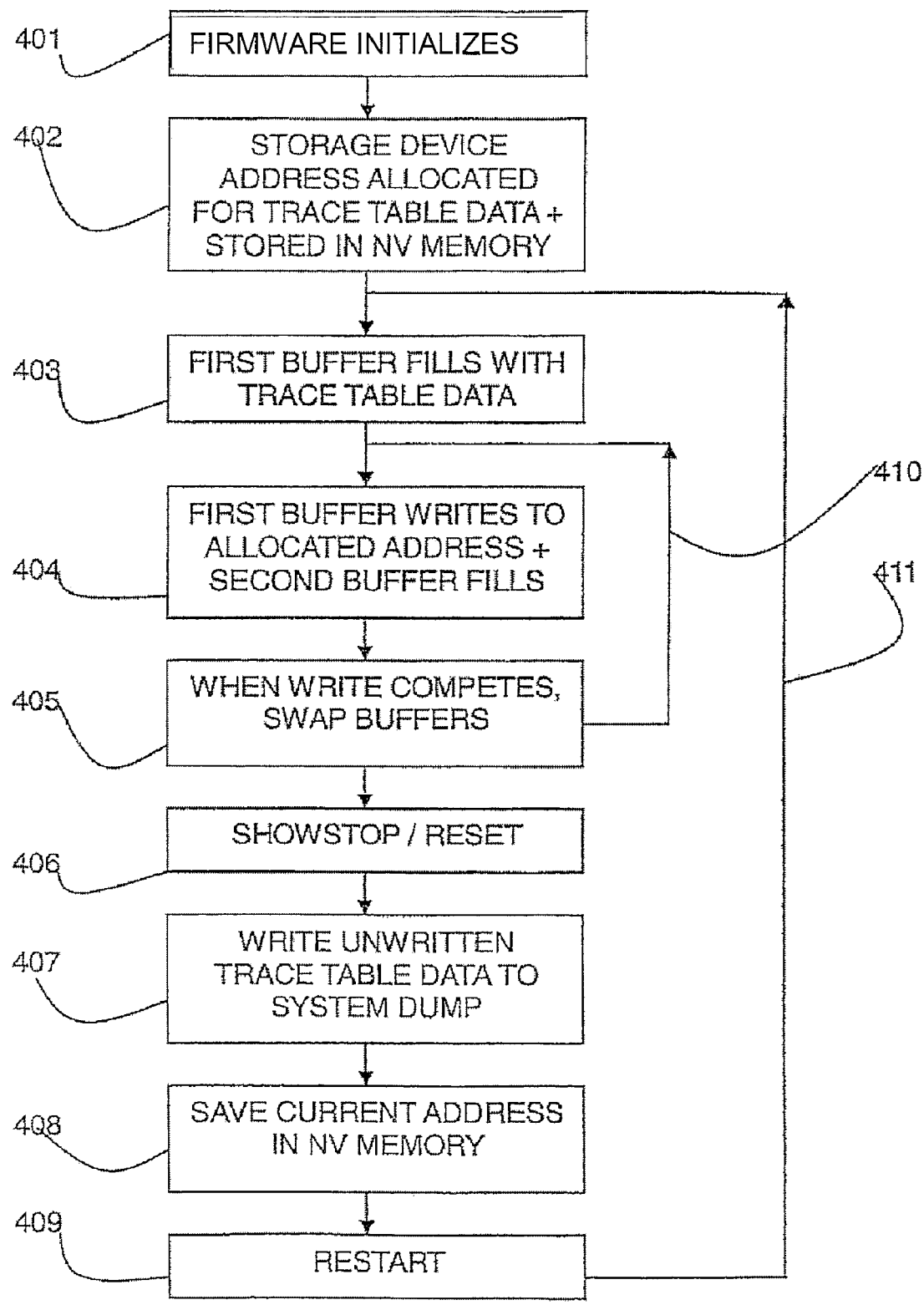
FIG. 4 is a flow diagram of a method of recording trace table information in accordance with the present invention.

FIG. 4 is a flow diagram illustrating the method of recording trace table data. In the first step 401, the firmware of the storage controller initialises and a storage device address is allocated for trace table data and stored in non-volatile memory in the storage controller 402.

Initially, both the buffers will be empty and a first buffer fills with trace table data 403. When the first buffer is full, the first buffer writes to the allocated address for the trace table data and the second buffer starts to fill with the new trace table data 404.

When the write from the first buffer completes, the buffers swap over 405. The buffers continue to operate in this way during operation of the storage controller recording the trace table data and saving it in batches to the allocated storage address. This is illustrated by the loop 410 of the flow diagram.

If the storage controller operation is interrupted 406, any unwritten trace table data in the buffers is sent to the system dump 407 and dumped to a storage device from which it can be retrieved. The current address of the storage device to which the trace table data is being written is stored to the non-volatile memory of the storage controller 408. The system restarts 409 and the trace table data is recorded to the buffers as before as shown by the loop 411 in the flow diagram.

An embodiment of the described method and apparatus are provided in which the storage array in a storage subsystem is a RAID array and the storage devices are disks. The storage device manager in the storage controller is a hot spare disk manager.

When the firmware of the storage controller initialises, a disk is reserved from the hot spare disk manager for use by the trace table data. This disk reservation is permanently stored by the hot spare disk manager to make it persistent through system resets.

During controlled shutdown, the present disk Logical Block Address used for the trace data is stored in non-volatile memory so that after reset the next trace data is written to the next available disk area to provide a continuous trace through the shutdown and reset cycle.

The described method is used to generate trace data continuously through a system shutdown or reset cycle without loss of trace information. This is achieved by writing any unwritten trace information to the system dump and recording information about the next available disk address for the trace table data in non-volatile memory. By providing a continuous trace history during a system shutdown or reset, valuable information can be gathered about the problem that caused the shutdown.

Individual trace table entries are not written to the storage device separately as this would involve a large performance impact due to prohibitive storage access rates. Therefore the arrangement of two buffers is used to collect the trace table data in batches for writing to the storage device.

The described method and apparatus provide quicker adapter card or storage controller firmware development thereby speeding the time to market and enabling better field support by facilitating improved problem determination. The problem determination is improved because a large trace table size is available for recording a long trace history. The size of the trace history is only limited by the allocated storage device size. A continuous trace history is also recorded through firmware shutdowns and resets. The trace history is permanently available as it is stored on a storage device.

The described method provides a cost effective solution to enlarging trace tables in the storage adapter card or storage controller firmware environments since using a storage device of an array is less expensive than increasing the amount of memory available in the adapter card or storage controller.

Improvements and modifications can be made to the foregoing without departing from the scope of the present invention.

What is claimed is:

1. A system for recording diagnostic information in a storage system that is composed of multiple storage devices, the system comprising:
a storage device manager for allocating a storage device, in the storage system, as an allocated storage device, wherein the allocated storage device stores diagnostic data, and wherein the allocated storage device is a reserve storage device that is normally reserved for disaster recovery; and
a diagnostic logic for generated diagnostic data regarding an operation of a storage controller of the storage system, wherein the storage controller uses a buffering technique to record and write batches of diagnostic data to the allocated storage device.

2. The system of claim 1, wherein the storage device manager is capable of allocating a hot spare storage device.

3. The system of claim 1, further comprising: a recording mechanism for recording an address of the allocated storage device in non-volatile memory in a storage controller of the storage system.

4. The system of claim 3, wherein, in response to an interruption to an operation of a storage controller of the storage system, a current address of the allocated storage device for storing diagnostic data is recorded in non-volatile memory in the storage controller, wherein upon resumption of the operation of the storage controller, storage of the diagnostic data is transmitted to the recorded address.

5. The system of claim 4, wherein, in response to the interruption, any unwritten diagnostic data is transmitted to a system dump.

6. The system claim 5, wherein, in response to the interruption to the operation of the storage controller, a continuous diagnostic data history is obtained by combining the diagnostic data in the system dump with the diagnostic data in the allocated storage device.

7. The system of claim 4 wherein the storage system is a RAID system and the interruption is a controlled shutdown of the storage controller.

8. The system of claim 1, wherein the buffering technique is a double buffering technique with a first batch of data being written while a second batch of data is being recorded, wherein the first batch of data comprises data that is different from data in the second batch of data.

9. The system of claim 1, wherein the buffering technique is a double buffering technique with a first batch of data being written at the same time as a second batch of data is being recorded, and wherein the double buffering technique comprises:
a writing mechanism for writing a first batch of trace data to a first buffer while a second batch of trace data is being transferred from a second buffer to the allocated storage device, wherein, in response to the first buffer being full and the second buffer being empty, the writing mechanism writes a third batch of trace data to the second buffer while the first batch of trace data is being transferred from the first buffer to the allocated storage device.

10. The system of claim 1, wherein the storage device is allocated, from the multiple storage devices, by a disk reservation for storing trace table data, wherein the trace table data is time-stamped status information that describes an operation of the storage controller to create an extended trace history, and wherein the extended trace history is required to determine problems that gradually develop in the storage controller over a period of time, and wherein the disk reservation is permanently stored by a hot spare disk manager to make the disk reservation persistent through system resets of the storage system.

11. A storage controller for recording diagnostic information in a storage system having multiple storage devices, the storage controller comprising:
a storage device manager for allocating a storage device in the storage system as an allocated storage device for storing diagnostic data, wherein the diagnostic data is stored in an area of the allocated storage device that is normally allocated for customer data, wherein the allocated storage device is a reserve storage device that is normally reserved for disaster recovery;
a diagnostic logic for generating diagnostic data regarding operation of a storage controller of the storage system; and
a buffer used to record and write batches of diagnostic data to the allocated storage device, wherein the storage controller uses a buffering technique to record and write the batches of diagnostic data to the area of the allocated storage device.

12. The system of claim 11, wherein the storage device manager is capable of allocating a hot spare storage device.

13. The system of claim 11, further comprising: a recording mechanism for recording an address of the allocated storage device in non-volatile memory in a storage controller of the storage system.

14. The system of claim 13, wherein, in response to an interruption to an operation of a storage controller of the storage system, a current address of the allocated storage device for storing diagnostic data is recorded in non-volatile memory in the storage controller, wherein upon resumption of the operation of the storage controller, storage of the diagnostic data is transmitted to the recorded address.

15. The system of claim 14, wherein, in response to the interruption, any unwritten diagnostic data is transmitted to a system dump.

16. The system claim 15, wherein, in response to the interruption to the operation of the storage controller, a continuous diagnostic data history is obtained by combining the diagnostic data in the system dump with the diagnostic data in the allocated storage device.

17. The system of claim 14, wherein the storage system is a RAID system and the interruption is a controlled shutdown of the storage controller.

18. The system of claim 11, wherein the buffering technique is a double buffering technique with a first batch of data being written while a second batch of data is being recorded, wherein the first batch of data comprises data that is different from data in the second batch of data.

19. The system of claim 11, wherein the buffering technique is a double buffering technique with a first batch of data being written at the same time as a second batch of data is being recorded, and wherein the double buffering technique comprises:
a writing mechanism for writing a first batch of trace data to a first buffer while a second batch of trace data is being transferred from a second buffer to the allocated storage device, wherein, in response to the first buffer being fill and the second buffer being empty, the writing mechanism writes a third batch of trace data to the second buffer while the first batch of trace data is being transferred from the first buffer to the allocated storage device.

20. The system of claim 11, wherein the storage device is allocated, from the multiple storage devices, by a disk reservation for storing trace table data, wherein the trace table data is time-stamped status information that describes an operation of the storage controller to create an extended trace history, and wherein the extended trace history is required to determine problems that gradually develop in the storage controller over a period of time, and wherein the disk reservation is permanently stored by a hot spare disk manager to make the disk reservation persistent through system resets of the storage system.

* * * * *